United States Patent [19]

Harguindey

[11] Patent Number: 4,494,603
[45] Date of Patent: Jan. 22, 1985

[54] WIRE MESH WELL SCREEN WITH WELDED WIRE SUPPORT

[75] Inventor: Julian E. Harguindey, Buenos Aires, Argentina

[73] Assignee: UOP Inc., Des Plaines, Ill.

[21] Appl. No.: 543,551

[22] Filed: Oct. 19, 1983

[51] Int. Cl.³ .............................................. E21B 43/08
[52] U.S. Cl. ..................................... 166/231; 166/230; 29/163.5 CW; 210/497.1
[58] Field of Search ................ 166/231, 230, 232–234, 166/227, 157, 236, 205; 29/163.5 CW, 456; 210/485, 494.2, 497.1, 499; 228/173 E

[56] References Cited

U.S. PATENT DOCUMENTS

| | | | |
|---|---|---|---|
| 101,469 | 4/1870 | Jones | 166/230 |
| 679,681 | 7/1901 | Latta | 166/230 |
| 746,096 | 12/1903 | Karsch | 166/230 |
| 1,662,726 | 3/1928 | Vernay | 210/335 |
| 2,035,758 | 3/1936 | Pierce | 210/497.1 |
| 2,217,370 | 10/1940 | Johnston | 166/230 |
| 2,985,241 | 5/1961 | Hanslip | 166/230 |

Primary Examiner—James A. Leppink
Assistant Examiner—Hoang C. Dang
Attorney, Agent, or Firm—William H. Page, II; Barry L. Clark

[57] ABSTRACT

Improved well screen has its open area defined by a helically wrapped strip of wire mesh which is supported by a rigid cage-like structure of welded steel longitudinal support rods and helical wrap wires. The design is cost competitive with the simple, and rather fragile, screens made by wrapping a mesh about a perforated pipe while offering the mechanical strength characteristics of wire-wrapped welded screens and a substantially larger open area for flow. The wire mesh strip is helically wound with a gap and at least one wrap wire is helically wound in the gap so that a small portion of its width can be firmly adhered to the rods while at least another portion of its width overlies an adjacent side edge of the mesh strip.

8 Claims, 6 Drawing Figures

WIRE MESH WELL SCREEN WITH WELDED WIRE SUPPORT

BACKGROUND OF THE INVENTION

The invention relates to well screens and particularly to water well screens for residential use in areas where the expense of sophisticated and very durable stainless steel screens having a wrap wire welded to a plurality of internal support rods cannot be economically justified. Typically, the screens used in such a situation have been produced by wrapping copper gauze or mesh around a plastic or steel pipe which has been perforated by drilling or sawing. The resulting screens are generally quite fragile due to exposure of the mesh on the surface. They are also inefficient, since they have a very small open area per unit of screen length.

SUMMARY OF THE INVENTION

It is among the objects of the present invention to provide a well screen which can be sold for a relatively low price but which has more open area per unit of length than prior art screens. Another object is to provide a well screen which utilizes a wrapped metal mesh strip as the filter medium but which is much less fragile and much more structurally sound than presently available wrapped mesh screens.

The foregoing and other objects and advantages are attained by the improved screen of the present invention in which a strip of woven wire mesh material such as tinned copper is helically wound about an annular array of metal support rods. The mesh strip is wound at a pitch slightly wider than the width of the mesh strip so as to define a narrow open gap. Simultaneously, at least one continuous length of wrap wire is helically wrapped at the same pitch as the mesh strip about the support rods and is integrally bonded to each rod at each intersection therewith, such as by resistance welding. The said at least one length of wrap wire is positioned so that at least one portion of the width of its cross-section will partially overlie an edge portion of the mesh strip and another portion of its width will partially overlie the open gap between adjacent wraps of the strip. It would be undesirable for the wire to overlap the strip completely since the presence of the strip would interfere with the ability of the wire and rods to be welded to each other. Preferably, the rods and wires are formed of galvanized low carbon steel and are bonded to each other by resistance welding. The improved well screen may be fabricated in a slightly modified arrangement of a conventional rod and wrapped wire assembly apparatus of the type shown in E. E. Johnson U.S. Pat. No. 2,046,460. However, instead of guiding a single wire into the path of a rotating welding wheel, it is preferred to simultaneously guide a pair of wires and the strip of mesh with the mesh strip being located beneath and between the wires. The welding wheel is preferably provided with spaced grooves in its outer peripheral surface to maintain an exact spacing between the pair of wires which will cause the tapered inboard sides of each wire to abut and retain the outer edge portions of the strip. The inboard side edges of each wire could also slightly overlap a thin outer edge portion of the strip so as to retain the strip without preventing the wires from being welded to the rods. The sides of the wrap wires are preferably tapered so as to be narrowest in cross-section near the location where they retain the mesh strip and where they are welded to the rods. The narrow tapered cross-section also enhances their ability to be welded. The wider outermost portions of the wrap wires are preferably assembled to the rods in a manner such that the wires touch each other but they could also be spaced by a distance no greater than the width of the flow openings in the mesh strip. Obviously, since the wires are spaced from each other by the mesh strip, it will be the upstream edge of the downstream wire that will engage the downstream edge of the mesh strip. To assist in retaining the mesh strip in place as the wrap wires are welded to the rods, the mesh strip is preferably wound under tension.

DETAILED DESCRIPTION OF THE INVENTION

Figure 1:
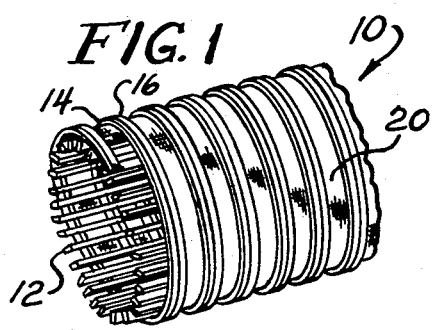
FIG. 1 is a partially broken away perspective view of a short length of well screen made in accordance with the invention.
Figure 2:
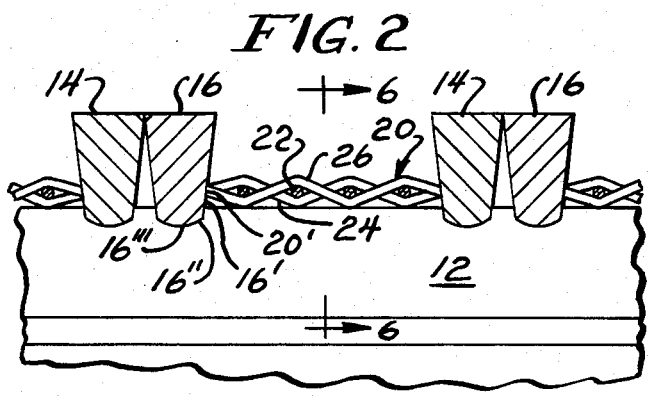
FIG. 2 is an enlarged view taken in a plane transverse to the axes of the wrap wires showing the relationship of the mesh strip, rods and wrap wires after welding.

Referring to FIG. 1, the improved screen is indicated generally at 10 and can be seen to comprise an annular array of circumferentially spaced support rods 12 which provide tensile strength to the screen. A pair of wrap wires 14, 16 are resistance welded to each of the rods 12 which they cross in order to maximize the strength of screen 10 and enhance its ability to resist compressive and torsional load stresses. A strip or ribbon of woven wire mesh material 20 comprising longitudinal wires 22 and cross wires 24, 26 is preferably captured at each of its side edges 20' and retained, as best seen in FIG. 2, in tight engagement with the plurality of rods 12 by the wedge or tapershaped narrow inboard side portions 14', 16' of the tapered wrap wires 14, 16. The strip 20 is preferably wound under a slight tension so as to firmly contact the rods 12. It is also preferably tacked to the rods at each end of the screen by a small bit of solder or a weld (not shown). The winding tension and the tapered wire sides 14', 16' cooperate to firmly retain the strip 20 in its FIG. 2 relationship with the rods 12 and the wires 14, 16 wherein a small portion of the width of wires 14, 16 overlies the strip. It would also be possible to use a slightly wider strip 20 or a smaller winding pitch for wires 14, 16 so that a narrow portion of the edges of strip 20 would be engaged by a narrow side portion 16" of the tip portion of the wire 16, for example. It would, however, be necessary to prevent the edges of the strip 20 from being positioned under the center portion 16''' of the cross-section of wire 16 since this would interfere with the ability to get a strong weld between wire 16 or wire 14 and the rods 12.

Figure 3:
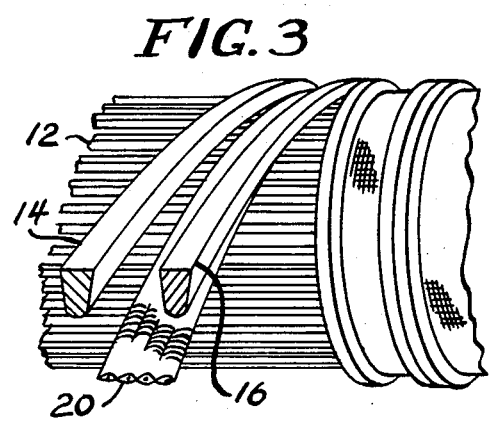
FIG. 3 is a perspective view illustrating the relationship of the mesh strip, rods and wrap wires before welding.
Figure 4:
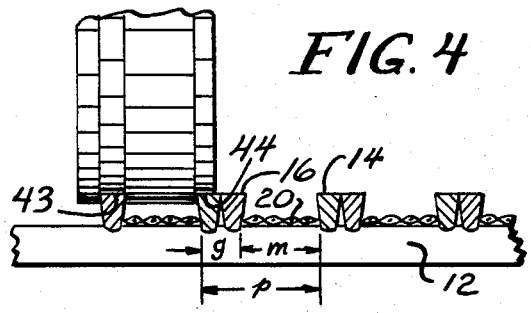
FIG. 4 is a view similar to FIG. 2 but showing the relationship of the double notched welding roller to the wrap wires and the mesh strip.
Figure 6:
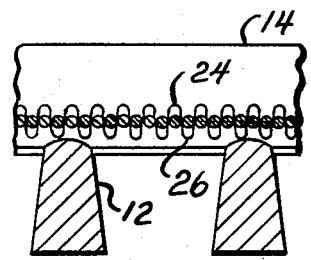
FIG. 6 is a cross-section taken on line 6—6 of FIG. 2.
Figure 5:
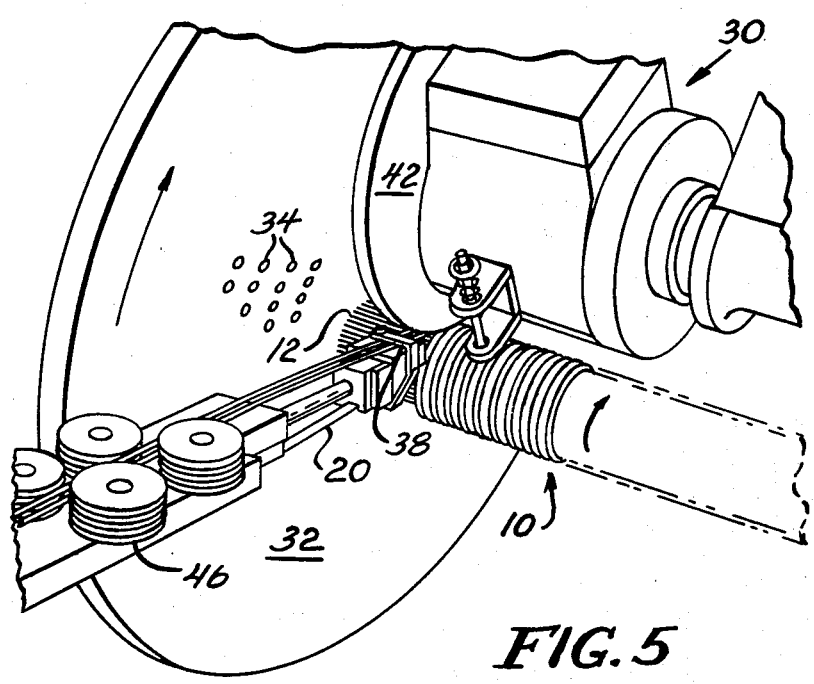
FIG. 5 is a perspective view illustrating the principal portions of the welding and assembly apparatus.

FIG. 3 illustrates the relationship of the wrap wires 14, 16 to the mesh strip 20 and the rods 12 during the winding and welding operation and FIGS. 4 and 5 illustrate the process and apparatus by which the screen 10 can be produced. The winding and welding machine 30 is of generally conventional construction and includes a rotating face plate 32 having a plurality of circles of apertures 34 for selectively accommodating support rods 12 to produce screens of different diameters. The right ends of the rods 12 are advanced longitudinally and rotated by a carriage and lead screw (not shown) in synchronization with the rotation of the face plate 32 so that the wrap wires 14, 16 which are guided by fixed guide 38 will be welded to the rods 12 at a precise pitch which is indicated by the dimension p in FIG. 4. The pitch p is greater than the width of the mesh strip m by the width of gap g. Thus, the wires 14, 16 can be welded to the rods 12 in the gap region g without interference from the strip 20. The welding is done by a rotatable welding wheel 42 having notches 43, 44 for receiving and guiding the wires 14, 16. Referring further to FIG. 5, the tapered cross-section wires 14, 16 are fed under tension from a supply coil (not shown) through straightening rollers 46 and the fixed guide 38. The mesh strip 20 is also fed from a supply coil (not shown) through the bottom of the fixed guide 38 so that it will be wrapped around the rods 12 under tension until it is captured by the wrap wires 14, 16. As previously noted, the side edges of the mesh strip 20 can abut the wires 14, 16 and be retained by their angled surfaces 14', 16' (FIG. 2). Alternatively, the gap g could be made slightly smaller so that portion 16" of wire 16, for example, would overlie one edge of the mesh strip 20. In either situation, a narrow portion of the total cross-sectional width of the wires 14, 16 will overlie an edge portion of the mesh strip. The FIG. 6 section taken on line 6—6 of FIG. 2 illustrates the effectiveness of the seal between the mesh strip 20 and the wires 14, 16 when the strip merely abuts the wires as shown in FIG. 2. The strip 20 would preferably be pre-slit from a wider web along paths intermediate a pair of longitudinal wires 22 so that the cross wires 24, 26 would intersect in a common plane on the edges of the strip in the same manner as shown in FIG. 6. However, such an orientation is not essential since the important point is that any openings other than those inherent to the woven mesh are no greater in dimension than those in the mesh. The open area of the screen assembly 10 is equal to the open area of the mesh strip 20 less the area of the mesh that are blocked by the rods 12. However, the last named area would be quite small since, as shown in FIG. 6, the rods 12 only touch the mesh strip over a portion of the width of their narrow, rounded end tips. Although open area will of course vary with the size of wire used to form the strip 20, one sample screen made as shown in the drawings was found to provide about 60% more open area than a wrapped wire screen of the same diameter whose filter area was formed solely by the slots which exist between its wraps. Although the wrapped wire slotted screen can probably be produced at less cost per unit of length than the screen disclosed herein, its lower flow area would require that substantially longer lengths of it be used to satisfy a particular flow requirement.

I claim as my invention:

1. A well screen comprising a plurality of longitudinal rods, a strip of wire mesh helically wrapped on the rods at a pitch slightly greater than the width of the strip of mesh so as to define a helical gap between adjacent wraps of said strip, at least one wire helically wrapped about said rods at the same pitch as said strip of wire mesh, said at least one wire being welded to each of said rods at each of its intersections therewith, said at least one wire being positioned in said helical gap so that a first narrow width portion thereof overlies an edge portion of said strip of wire mesh while an adjacent second width portion, which includes the welded intersections with said rods, does not overlie said strip of wire mesh.

2. A well screen in accordance with claim 1 wherein said at least one wire has tapered sides which converge toward a narrow end surface portion of the wire which is welded to said rods.

3. A well screen in accordance with claim 2 wherein an edge portion of said strip of wire mesh abuts a tapered side of said at least one wire adjacent to said narrow end surface.

4. A well screen in accordance with claim 3 wherein said strip is in tight contact with the outer surfaces of the rods about which it is wrapped and is retained on its edges by the wedging action of said tapered sides.

5. A well screen in accordance with claim 4 wherein said strip abuts said at least one wire at a distance from the narrow end surface of said wire which is about equal to the distance by which said at least one wire is embedded in said rods during welding.

6. A method of making a wrapped wire well screen of greater open area than is possible by helically wrapping a wire about a plurality of rods comprising the steps of winding at least one wrap wire in a helical manner about a plurality of parallel, circumferentially spaced rods, and at a pitch much greater than normal so as to define a large helical gap, winding a strip of woven wire mesh in said helical gap so as to be in contact with said rods and so that one of its side edges will engage a side surface of said at least one wrap wire, and welding said at least one wire to said rods at every intersection therewith.

7. A method according to claim 6 wherein said strip is wound on said rods between a pair of wrap wires and in engagement with a side wall of each of them.

8. A method according to claim 7 wherein said wrap wires have tapered sides which abut and wedge the edges of said strip downwardly into engagement with said rods, said wires being wound so that the distance between them at their closest position is less than the width of said strip.

* * * * *